Sept. 3, 1935.  H. BURNS  2,013,131

FRUIT PACKING CASE

Filed Feb. 28, 1934

H. Burns
INVENTOR

By: Marks & Clerk
Attys.

Patented Sept. 3, 1935

2,013,131

UNITED STATES PATENT OFFICE 2,013,131

FRUIT PACKING CASE

Hugh Burns, Ormond, Victoria, Australia

Application February 28, 1934, Serial No. 713,395
In Australia April 22, 1933

6 Claims. (Cl. 217—56)

The invention refers to the construction of cases in which fresh fruits such as apples, pears, oranges, pineapples and the like are packed for storage and transport.

Cases for holding such fruit are made of light wooden slats with substantial ends to which slats are fastened and the case is filled with fruit sufficiently to cause the light lid and floor to bulge outwards when the lid is placed in position to close the case. This practice has been found necessary when packing fruit such as apples owing to the tendency of the fruit to shrink during storage so that when a case is removed from a store or a ship's hold for sale and the lid is removed, the case will still be full, though the size of each individual piece is somewhat smaller than when placed in the case.

When a shipment is made the cases are separated in the ship's hold or chambers by packing strips or dunnage that are laid between the cases to allow for the free circulation of air throughout the mass. As the shrinkage takes place the looser the pack becomes and the fruit will tend to move in its case as the ship rolls, thus causing the fruit to deteriorate. At the end of the voyage the dunnage is collected and separately disposed of.

Now this invention has for one of its objects to provide a fruit case in which fruit can be packed in such a way that during storage the pieces in a case shall remain as tightly packed or approximately so as when it left the packing sheds.

Another object of the invention is to provide each case with integral dunnage as opposed to the separate or foreign dunnage as now used. That is to say, each case will be fitted with exterior pieces in such a manner that when stowed the free circulation of air throughout the mass will be possible.

To provide the required flexibility, I form the case carcase of two stout ends with substantial sides and cover the contents of the case at the base by cleated slats that are free to move upon the fruit as the case is filled or as the fruit shrinks during storage. The cover at the top is provided by like cleated slats, the upper and lower members being retained in place by stout battens securely attached to the case ends to definitely close the case.

But in order to fully understand the invention reference is made to the accompanying drawing in which—

Figure 1:
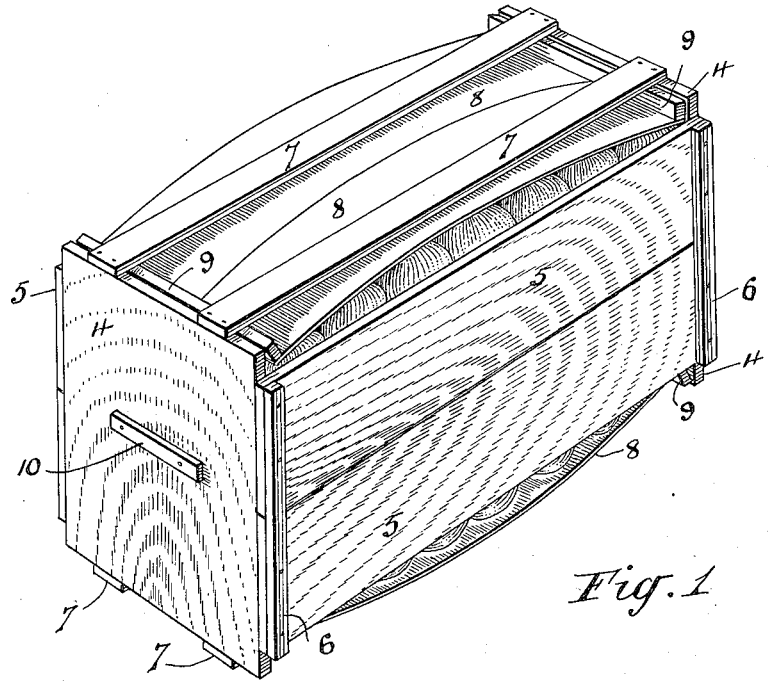
Fig. 1 is a perspective view of my improved case, filled with fruit and ready to be stowed.
Figure 2:
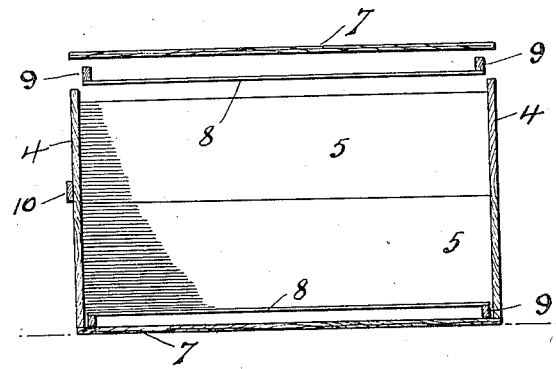
Fig. 2 is a side sectional elevation of the same.
Figure 3:
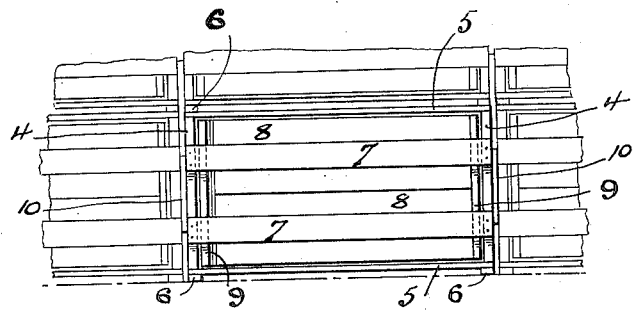
Fig. 3 shows in elevation how the cases are stacked, the member illustrated in Fig. 1 being turned on its right hand side.

To avoid confusion, it should be explained that in this description the fruit is filled into a case in the packing position of Fig. 1, and that when filled and closed it is turned over to assume the storage position with its stout sides below and above the packed fruit.

The carcase is composed of the ends 4 and the stout sides 5 to which transverse cleats 6 are attached. The ends should extend slightly beyond the sides. The carcase is supported by the stout battens 7, say of a dimension of two and three quarters (2¾) of an inch by five sixteenths (5/16) of an inch for apples attached to the upper and lower edges of the ends 4. In the open or packing position the lower pair only will be in place over the open carcase and to provide a floor to the case, I use a light slat or slats 8 attached to cleats 9 at the ends that rest upon the battens to support the fruit as it is placed in the case. These slats 8 are considerably lighter than the sides 5 which, it is suggested, can be made of wooden pieces about five sixteenths (5/16) of an inch in thickness while the thickness of the slats 8 may be not more than one eighth (⅛) of an inch. The depth of the cleats 9 is sufficient to provide a space between each slat and the battens in which the slats may be permitted to flex or bulge over the pack. The cleated slats are narrower than the carcase.

The lower member 8 having been placed in position the case is filled, to overflow if desired, with the central portion fairly tightly packed so that when the case is closed, the top and bottom slat coverings will extend beyond the sides 5. The top cover, composed of cleated slats 8 and precisely similar to the floor member is then placed on the pack, cleats upwards, after which the upper pair of battens 7 is secured in position to close the case. A short distance piece 10 may, if desired be nailed to one end 4 which assumes a vertical position when the case is placed in the storage position.

The cleated members 8 being loosely disposed in the case and while serving as covers thereto will adapt themselves to the pack, bulging or flexing outwardly at the beginning and gradually closing inwards on the pack as the contents shrink.

Thus, my invention assures that the light flexing members 8 will adequately retain the pieces constituting the pack in place without damage, under normal conditions of handling and during transport, while the attached or integral external members 6, 7 and 10 will permit the free circulation of air about the cases when stacked. The contents of the case while held between the flexing members will be free to move as a whole within certain limits under shock and may be described as "a floating pack".

The sides 5 are preferably composed of one piece and not two, as shown, and between each end of the cleated slats 8 and the pack a layer of filling such as wood wool may be placed immediately under the cleats 9.

Having now described my invention what I claim as new and desire to secure by Letters Patent is:—

1. A fruit case having stout ends and sides, longitudinal battens secured to the ends, light slats within the battens disposed loosely as top and bottom covers to the pack in the case and outstanding cleats on the ends of the slats in loose contact with the battens, the light slats being free to curve towards the battens under pressure from the pack.

2. A fruit case having stout ends and sides, longitudinal battens secured to the ends, light slats within the battens disposed loosely as top and bottom covers to the pack, outstanding cleats on the ends of the slats in loose contact with the battens, the slats being free to curve towards the battens under pressure from the pack but not to flex enough to touch said battens.

3. A fruit case having a carcase for retaining the pack, light cleated slats that ride loosely upon the pack and having top and bottom battens secured to the ends over the slats and that is closed only after the second set of battens is secured to the carcase.

4. In a fruit case, a carcase for holding the contents or pack, light slats at a longitudinal side thereof, transverse cleats at the ends of the slats projecting outwardly constituting a floating frame and longitudinal battens attached to the carcase ends over and confining said frame.

5. In a fruit case, a carcase for holding the contents or pack, light slats at a longitudinal side thereof within the carcase ends, transverse cleats at the ends of the slats projecting outwardly constituting a floating frame, longitudinal battens attached to the carcase ends over the slats and confining said frame and a transverse exterior distance piece on one of the sides of the carcase.

6. In a fruit case, a carcase for holding the contents or pack, light slats at a longitudinal side thereof within the carcase, transverse cleats across the ends of the slats projecting outwardly constituting a floating frame, longitudinal battens attached to the carcase ends over the slats and confining said frame, a transverse exterior distance piece on one of the sides of the carcase and a short exterior distance piece on one of the ends of the same.

HUGH BURNS.